UNITED STATES PATENT OFFICE.

TRAUGOTT SANDMEYER, OF BASLE, SWITZERLAND, ASSIGNOR TO JOHN R. GEIGY & CO., OF SAME PLACE.

ALPHA-ISATIN ANILID.

SPECIFICATION forming part of Letters Patent No. 647,281, dated April 10, 1900.

Application filed December 7, 1899. Serial No. 739,508. (Specimens.)

*To all whom it may concern:*

Be it known that I, TRAUGOTT SANDMEYER, a citizen of the Swiss Confederation, residing at Basle, Switzerland, have invented certain new and useful Improvements in Alpha-Isatin Anilid, of which the following is a specification.

To the present invention (for which patents have been applied for in Germany, G 13,633, dated July 17, 1899; in France, No. 279,418, dated August 2, 1899; in England, No. 15,497/99, dated July 27, 1899; in Belgium, dated August 1, 1899; in Russia, dated August 1, 1899; in Italy, dated August 1, 1899; in Spain, No. 24,756, dated August 1, 1899; in Austria, dated August 1, 1899, and in Hungary, dated August 1, 1899, No. 13,536) I was directed by the observation that isonitrosoethenyldiphenylamidin is easily transformed into a derivative of isatin, (see application, Serial No. 739,506, filed December 7, 1899,) which observation led me to suppose that also other bodies relating to the former compound might be capable by forming a cycle of conversion into alpha-isatinanilid when treated with concentrated sulfuric acid. It was necessary to especially consider those two compounds which by conversion of the isonitroso group, either in the cyan or in the carboxyamido group, could be treated as intermediary bodies, according as the action of the sulfuric acid was supposed to be a depriving of water or only a transforming action.

With regard to the cyanid it is identical with the hydrocyancarbodiphenylimid prepared by Laubenheimer (*Berl. Ber.*, XIII, 2155) in combining hydrocyanic acid with carbodiphenylimid. Laubenheimer mentions as a characteristic reaction of this body that in heating with concentrated sulfuric acid it gives a red-colored solution which by dilution with water becomes clear. When a few drops of this solution are poured into water and some caustic-soda lye added, an intensely-blue-colored solution is obtained, which color gradually fades. The surprising conformity in the appearance of the colors in this reaction with those which appear by heating isonitrosoethenyldiphenylamidin with concentrated sulfuric acid, diluting with water, and neutralizing with caustic-soda lye have rendered probable the formation of the same product of reaction—namely, the alpha-isatinanilid. A special examination showed, however, that alpha-isatinanilid is formed by this process only in very small quantities. An almost quantitative formation of alpha-isatinanilid can, however, be obtained, as I have further found, in the following manner:

Hydrocyancarbodiphenylimid is treated with a yellow solution of ammonium sulfid. The former combines with one molecule of sulfureted hydrogen of the latter and forms the thioamid of the formula

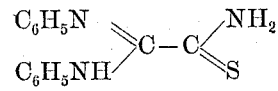

By dissolving this compound in warm sulfuric acid the interior condensation takes place, forming alpha-isatinanilid and separating out ammonia and sulfureted hydrogen, which latter immediately acts upon the sulfuric acid, forming sulfurous acid and separating sulfur:

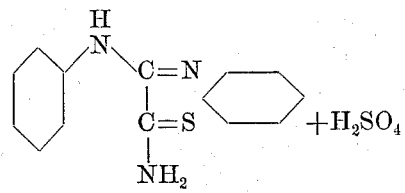

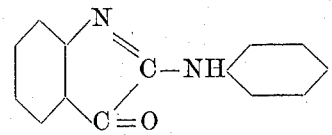

or in the tautomeric pseudoform

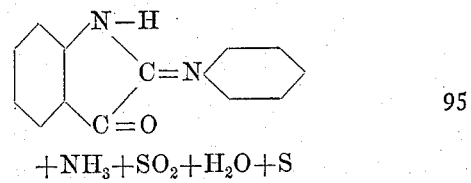

$+NH_3+SO_2+H_2O+S$

Hydrocyancarbodiphenylimid has been prepared by Laubenheimer in two different ways—first, by boiling thiocarbanilid in alcoholic solution with mercuric cynanid for a long time, and, second, introducing hydrocyanic acid in excess into a freshly-prepared solution (according to Weith, *Berl. Ber.*, VII, 1306) of unpolymerized carbodiphenylimid in benzene. Both methods are unsuited for practical use.

The process described can be easily carried out with any quantities and without much danger if the removal of the sulfur is brought about by basic carbonate of lead in the presence of a soluble cyanid—as, for instance, potassium-cyanid. The carbonate of lead deprives the thiocarbanilid of sulfureted hydrogen in forming sulfid of lead, the nascent carbonic acid decomposes the potassium-cyanid and the nascent hydrocyanic acid combines instantaneously with the liberated carbodiphenylimid, forming hydrocyancarbodiphenylimid.

The following examples illustrate the manner in which my invention can best be carried into practical effect. The parts are by weight:

*First phase of the process—Production of hydrocyancarbodiphenylimid.*—The process for the production of this substance mentioned by Laubenheimer (*Berichte der Deutschen Chemischen Gesellschaft*, Vol. XIII, p. 2155) is unsuited for practice on account of the use of free hydrocyanic acid or of mercuric cyanid. Without the slightest danger hydrocyancarbodiphenylimid can be prepared in the following way: In a vessel fitted with a stirrer are dissolved seven parts of potassium-cyanid of ninety-eight per cent. (or the equivalent quantity of ordinary potassium-cyanid of less percentage or of sodium-cyanid) in twenty parts of water. To this solution are added thirty parts of basic carbonate of lead, (white lead,) twenty-one parts of thiocarbanilid, and fifty parts of alcohol. Then, while stirring, the solution is slowly heated up to 50° to 60° centigrade. After a short time the reaction is finished, which is indicated when a test filtered off from the sulfid of lead and boiled with carbonate of lead does not blacken it. When cold, the contents of the vessel are diluted with water and the insoluble mixture of sulfid of lead and hydrocyanid is filtered off. After pressing and drying, the hydrocyancarbodiphenylimid is separated from the sulfid of lead by extraction with alcohol or ether. The sulfid of lead is transformed by hydrochloric acid into chlorid of lead, and this again into white lead.

The preceding method may be varied in different ways without modification of the final result. For instance, the alcohol may be left out; but in this case the finely-pulverized thiocarbanilid must be mixed very carefully with the white lead and the aqueous solution of potassium-cyanid of about ten per cent. The transformation takes place at 30° to 40° centigrade, though somewhat slower. Further, the white lead can be substituted by other basic lead salts, such as oxychlorid of lead.

*Second phase of the process—Production of a thioamid from hydrocyancarbodiphenylimid.*—In a closed vessel fitted with a stirrer twenty parts of finely-pulverized hydrocyancarbodiphenylimid are mixed with fifty parts of a solution of yellow ammonium sulfid which has been prepared by introducing three parts of sulfureted hydrogen into forty-five parts of aqua-ammonia of twenty-one to twenty-two per cent., and by further dissolving in the colorless solution of ammonium sulfid thereby formed 2.5 parts of pulverized sulfur, or by introducing five parts of sulfureted hydrogen into the abovesaid forty-five parts of aqua-ammonia and allowing the solution to stand for several days till it assumes a deep-yellow color. The formation of the thioamid is accelerated by stirring at a temperature of 25° to 30° centigrade, and completion of the reaction is indicated when a filtered and washed test dissolves completely in diluted hydrochloric acid. One or two days are required for the reaction. The thus-formed thioamid of the formula

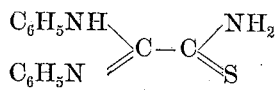

which is a lemon-colored crystalline powder, is then filtered off, washed, and dried. Recrystallized from alcohol it forms brilliant thin golden-yellow prisms, melting at 161° to 162° centigrade and dissolving in diluted mineral acids and, if warmed, also in diluted caustic-soda lye.

*Third phase of the process—Production of alpha-isatinanilid.*—Eighty parts of concentrated sulfuric acid are heated up to 90° centigrade. Then there are added gradually, with stirring, twenty parts of the above-mentioned well-dried thioamid. Care must be taken that the rise of temperature, which occurs after every addition, does not exceed 95° centigrade. Under vigorous development of sulfurous acid the thioamid dissolves, and the sulfuric acid assumes first a deep brownish-violet color and finally turns to an intensely-yellowish red. When all is mixed, the temperature is raised to 105° to 110° centigrade till the development of the sulfurous acid ceases. After completely cooling the concentrated sulfuric solution is poured, under constant stirring, into a solution of an excess of carbonate of soda with a sufficient quantity of ice. The alpha-isatinanilid is precipitated in brown crystalline flocks and is filtered, pressed, and dried at low temperature. By recrystallization from benzene or carbon disulfid it can be separated from the sulfur set at liberty by the reaction and mixed with the alpha-isatinanilid. Alpha-isatinanilid crystallizes in brilliant dark-brownish violet almost-black needles, melting at 126° centigrade and easily soluble in warm alcohol with a yellowish-brown shade; in ether, in benzene, and carbon disulfid with a raspberry-red shade. It is easily soluble, likewise, in organic as well as in mineral acids with a yellowish-red shade.

When the yellowish-brown alcoholic solution is mixed with some caustic-soda lye, the color turns to an intense blue, growing pale after a short time.

What I claim as new, and desire to secure by Letters Patent, is—

As a new product, the herein-described alpha-anilid of isatin, having the formula

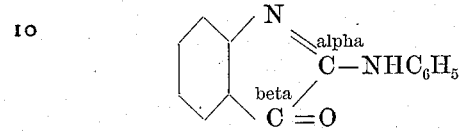

or in the tautomeric pseudoform

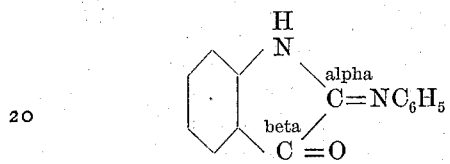

and obtained by producing a reaction of basic carbonate of lead (white lead) upon thiocarbanilid in the presence of an alkalicyanid, treating the thus-obtained hydrocyancarbodiphenylimid with a solution of yellow ammonium sulfid, and transforming the thus-prepared thioamid by hot sulfuric acid, said alpha-anilid of isatin forming brilliant dark-brownish violet nearly-black needles melting at 126° centigrade, easily soluble in warm alcohol with a yellowish-brown shade, in ether, in benzene and carbon disulfid with a raspberry-red shade, easily soluble in organic as well as in mineral acids with a yellowish-red shade, and the yellowish-brown color of its alcoholic solution turning to an intense blue by addition of caustic-soda lye and growing pale after a short time, substantially as set forth.

In testimony that I claim the foregoing as my invention I have signed my name in presence of two subscribing witnesses.

TRAUGOTT SANDMEYER.

Witnesses:
GEORGE GIFFORD,
ALBERT GRAETER.